(12) United States Patent
Touge

(10) Patent No.: US 6,703,928 B2
(45) Date of Patent: Mar. 9, 2004

(54) CLOSED SPACE MONITOR SYSTEM

(75) Inventor: Hiroshi Touge, Ichinomiya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/103,819

(22) Filed: Mar. 25, 2002

(65) Prior Publication Data

US 2002/0154013 A1 Oct. 24, 2002

(30) Foreign Application Priority Data

Mar. 23, 2001 (JP) ..................................... 2001-086092

(51) Int. Cl.⁷ .............................................. B60R 25/10
(52) U.S. Cl. ...................... 340/426.1; 340/544; 340/541
(58) Field of Search .............................. 340/426.1, 544, 340/541, 566; 367/93

(56) References Cited

U.S. PATENT DOCUMENTS

| | | | | |
|---|---|---|---|---|
| 4,386,342 A | * | 5/1983 | McKinley | .................... 340/544 |
| 5,185,593 A | * | 2/1993 | DuRand et al. | .............. 340/544 |
| RE34,788 E | * | 11/1994 | DuRand et al. | .............. 340/550 |
| 5,424,711 A | | 6/1995 | Muller et al. | |
| 5,677,666 A | * | 10/1997 | Stallbohm | ............... 340/426.27 |
| 5,691,697 A | * | 11/1997 | Carvalho et al. | ........... 340/544 |
| 6,204,762 B1 | * | 3/2001 | Dering et al. | ................ 340/541 |

FOREIGN PATENT DOCUMENTS

| | | |
|---|---|---|
| JP | 9-272402 A | 10/1997 |
| JP | 11-198763 A | 7/1999 |

* cited by examiner

*Primary Examiner*—John Tweel
(74) *Attorney, Agent, or Firm*—Burns, Doane, Swecker & Mathis, LLP

(57) ABSTRACT

A closed space monitor system monitors the closed space by detecting a change in the air flow and the volume change of the closed space. The closed space monitor system includes a transmitter for generating and transmitting a compression wave of gas, a receiver for receiving the compression wave of gas, a inverting amplifier for amplifying the signal from the receiver via an electric current-voltage conversion portion, and automatic gain control portion. The amplified signal from the receiver is transmitted from the transmitter for generating the stationary wave in the closed space.

19 Claims, 3 Drawing Sheets

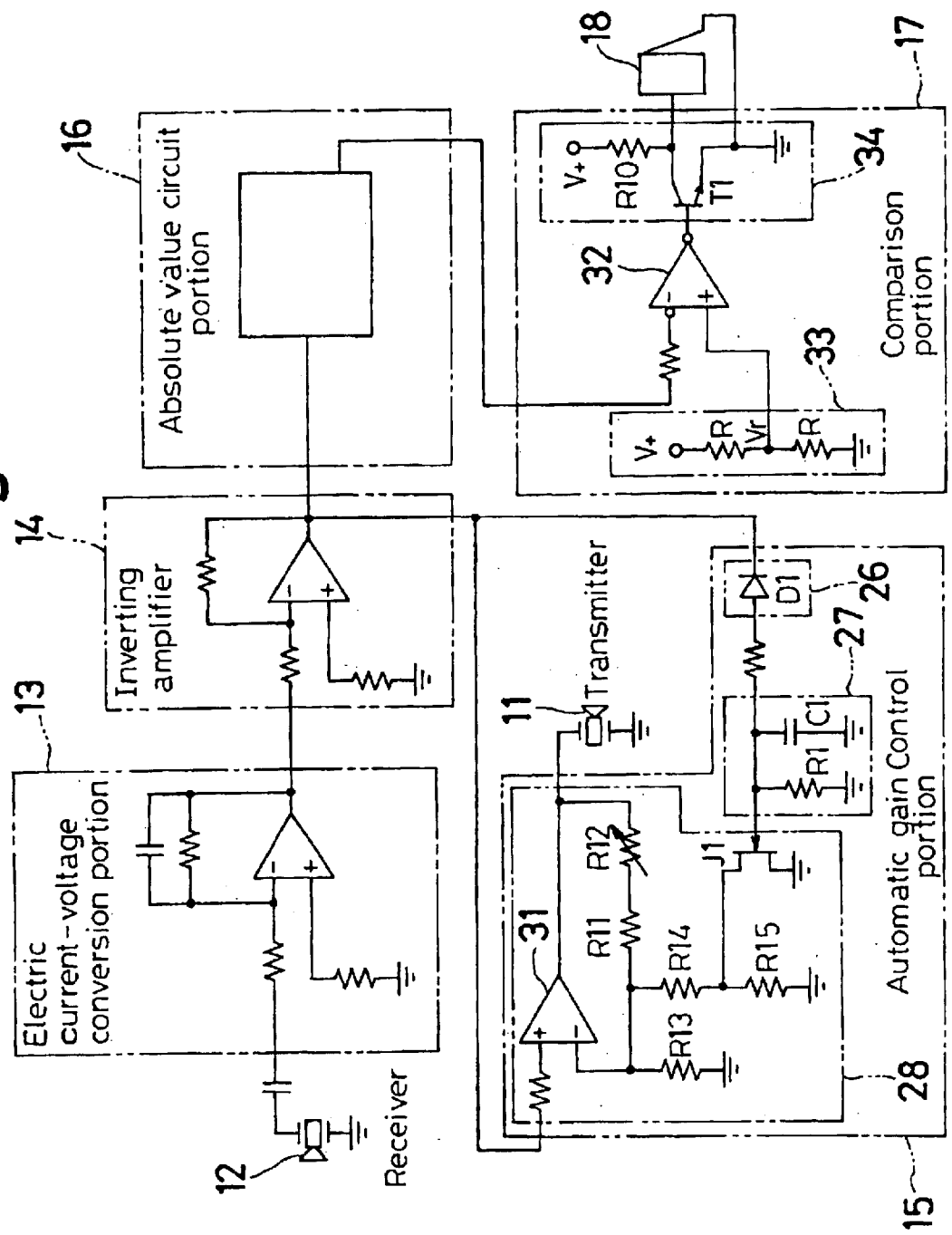

⇐ Transmitting direction

CLOSED SPACE MONITOR SYSTEM

This application is based on and claims priority under 35 U.S.C. § 119 with respect to Japanese Application No. 2001-086092 filed on Mar. 23, 2001, the entire content of which is incorporated herein by reference.

FIELD OF THE INVENTION

This invention generally relates to a closed space monitor system. More particularly, the present invention pertains to a closed space monitor system for monitoring a closed space such as the inside or interior of a parked vehicle.

BACKGROUND OF THE INVENTION

Various proposals have been made for closed space monitor systems for detecting the presence of intruders in closed spaces such as inside of a parked vehicle. Known closed space monitor systems include a device having a door sensor which performs intrusion detection by detecting a change of an output (i.e., potential), a device which performs intrusion detection by generating an ultrasonic wave and detecting the presence of a reflected wave thereof in the vehicle, and a device which performs intrusion detection by detecting intruders through use of the Doppler effect of the ultrasonic wave and the radar.

However, the aforementioned known closed space monitor systems are susceptible to temperature changes and electromagnetic noise. Consequently, the reliability of the intrusion detection performance of these known closed space monitor systems is relatively low.

With specific regard to the closed space monitor system for detecting the intruders through use of a door sensor, if the wiring is bypassed for not generating the change of the potential, the system is invalidated. Concerning the closed space monitor system that detects intruders by the presence of the reflection wave of the ultrasonic wave, the monitoring performance of the entire closed space is insufficient in light of the dead area formed by, for example, the seats in the interior of the vehicle.

With respect to the closed space monitor system that detects intruders by the Doppler effect of the ultrasonic wave and the radar, the system may not react to a slowly moving object (i.e., an intruder). In addition, with respect to the closed space monitor system for detecting the intruders with the infrared radiation, the system may cause operational error by the incoming radiation of the sun and the exposure to light.

A need thus exists for a closed space monitor system for monitoring the presence of intruders that is not as susceptible to the disadvantages and drawbacks noted above.

SUMMARY OF THE INVENTION

According to one aspect, a closed space monitor system includes a transmitter for generating and transmitting a compression wave of gas, a receiver for receiving the compression wave of gas, and an amplifier portion for amplifying a signal transmitted from the receiver. The amplified signal from the receiver is transmitted from the transmitter for generating a stationary wave in the closed space.

According to another aspect, a closed space monitor system in a vehicle detects the occurrence of an intrusion into a closed space in the vehicle. The system includes a transmitter for generating and transmitting a compression wave of gas, a receiver for receiving the compression wave and transmitting a signal, and an amplifier which amplifies the signal transmitted from the receiver, with the amplified signal from the receiver being transmitted from the transmitter for generating in the closed space of the vehicle a stationary wave having an amplitude value and an effective value. A judging mechanism judges the occurrence of an intrusion into the closed space of the vehicle based on a fluctuation of the amplitude value of the stationary wave or the effective value of the stationary wave.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 1 is a schematic illustration of the electrical construction of a closed space monitor system according to an embodiment of the present invention.

DETAILED DESCRIPTION OF THE INVENTION

Figure 2A:
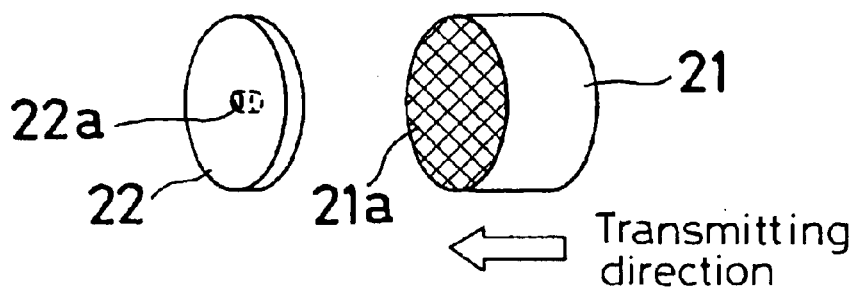
FIG. 2(a) is a perspective view of the components forming a transmitter used in the closed space monitor system.
Figure 2B:
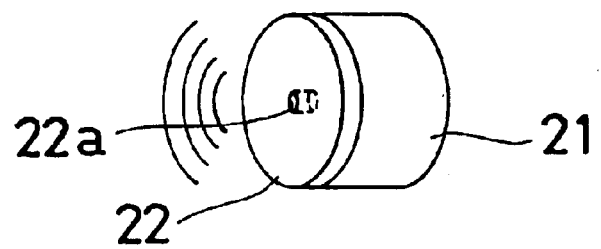
FIG. 2(b) is a perspective view of the transmitter illustrating the components shown in FIG. 2(a) in an assembled condition.
Figure 3:
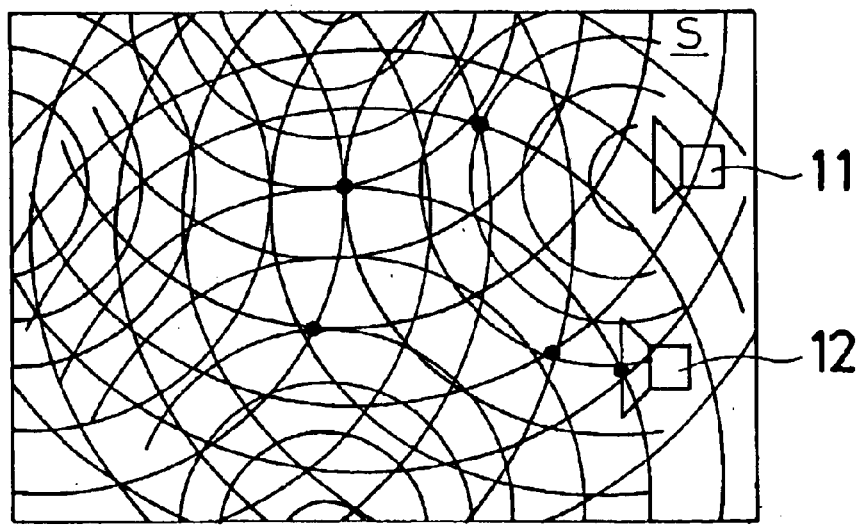
FIG. 3 is a schematic illustration of a closed space illustrating the operation of the closed space monitor system.

FIGS. 1–3 illustrate one embodiment of a closed space monitor system according to the present invention. The closed space monitor system for detecting an intruder to the closed space such as the inside of a vehicle (a parked vehicle) includes a transmitter 11, a receiver 12, an electric current-voltage conversion portion 13, an inverting amplifier 14, an automatic gain control portion 15, an absolute value circuit portion 16, a comparison portion 17, and a buzzer 18.

The transmitter 11 converts an amplified signal (i.e. electric signal energy) from the receiver 12 to acoustic energy to be directed (i.e., transmitted) into the closed space. That is, the transmitter 11 includes frequency characteristics able to transmit the signal which within a frequency band for generating a compression wave of gas such as an ultrasonic wave and a sonic wave. As shown in FIG. 2(a), the transmitter 11 includes a multi-purpose directional condenser speaker 21 and a lid body 22 having a hole (pinhole) 22a. The hole 22a is located at approximately the central portion of the lid body 22. The lid body 22 covers the output portion 21a of the condenser speaker 21. Thus, the signal (i.e., the compression wave) transmitted from the transmitter 11, in a transmitting direction indicated by the arrow in FIG. 2(a), is spread spherically by virtue of being diffracted via the pinhole 22a. Accordingly, the signal (i.e. the compression wave) is propagated to the entire closed space irrespective of the presence of obstacles. FIG. 2(b) illustrates the condenser speaker 21 and the lid body 22 in the assembled state.

The receiver 12 converts the acoustic energy in the space to electric signal energy. That is, the receiver 12 includes frequency characteristics for receiving the signal within the frequency band of the compression wave such as the ultrasonic wave and the sonic wave transmitted from the transmitter 11. The receiver 12 includes a multi-purpose directional condenser microphone.

As shown in FIG. 3, the transmitter 11 and the receiver 12 are positioned in the closed space S so as not to be opposed to each other so that the transmitting direction and the receiving direction (i.e., the signal communication direction) are approximately parallel each other. In addition, mounting surfaces of the transmitter 11 and the receiver 12 (i.e., a plane surface approximately at a right angle relative to the signal communication direction at the base end portion of each of the transmitter 11 and the receiver 12) are positioned to be located on different surfaces. This construction avoids the possibility that the signal transmitted from the transmitter 11 is directly received by the receiver 12 to be amplified. According to this embodiment, the transmitter 11 and the receiver 12 include approximately the same frequency characteristics.

By repeating a cycle for transmitting the received signal (i.e., the compression wave) by the receiver 12 from the transmitter 11 after being amplified and for re-receiving the transmitted signal (i.e. the compression wave) by the receiver 12 for reflecting to the next transmission from the transmitter 11, a stationary wave is generated by the reflection wave to be converged to the static state (i.e., the stationary wave that includes antinodes and wave nodes). Because the stationary wave at the static state is amplified greater than the compression wave, the stationary wave at the static state includes the frequency characteristics positioned to be a maximum amplitude (i.e., antinode) at the input portion of the receiver 12. Because there are various modes serving as the stationary wave, the signal is converged to different stationary waves in accordance with the environmental conditions and other conditions (i.e., the size of the closed space, the form, the housed objects, and the interior temperature).

The electric current-voltage conversion portion 13 includes a passive element and an operational amplifier constructing a circuit. The electric current-voltage conversion portion 13 includes a predetermined band pass characteristic for performing the electric current-electric voltage conversion for the signal belonging to the same band as the signal from the receiver 12.

The inverting amplifier 14 includes a known circuit construction including an operational amplifier having an inversion input terminal connected with feedback resistance and an input resistance (i.e., resistance in series). The inverting amplifier 14 amplifies the signal from the electric current-voltage conversion portion 13 and delays the signal received from the receiver 12 by 360 degrees. Thus, the signal received from the receiver 12 is amplified in the same phase to be outputted from the transmitter 11 again.

The automatic gain control portion 15 automatically changes the gain so that the signal strength (i.e., amplitude ratio) transmitted from the transmitter 11 in accordance with the signal strength from the receiver 12 becomes approximately constant for stabilizing the generated stationary wave (i.e., the amplitude value or effective value). The automatic gain control portion 15 includes a detection circuit 26 connected to an output terminal of the inverting amplifier 14, a low-pass filter 27, and a variable amplifier 28.

The detecting wave circuit 26 including a diode D1 erases a half portion of the signal from the inverting amplifier 14 (i.e., half-wave rectification). The low-pass filter 27 connected to the detection circuit 26 includes a condenser C1 and a resistor (resistance) R1. Thus, the low-pass filter 27 only allows the passage of the signal with the low frequency in the signal from the detecting wave circuit 26. The signal passing through the low-pass filter 27 outputs a stable electric voltage in accordance with the amplitude value when the signal from the receiver 12 is stable, that is when the stationary wave is stable. On the other hand, the electric voltage outputted from the signal passing through the low-pass filter 27 fluctuates in accordance with time constant of the charge and discharge of CR when the sudden fluctuation is generated in the stationary wave at the start of the closed space monitor system and because of air flow. In other words, according to this embodiment, the sensitivity relative to the fluctuation of the stationary wave is determined by the volume of the condenser C1 which determines the time constant. The sensitivity relative to the fluctuation of the stationary wave is predetermined to absorb the temperature change under the normal environment and the external oscillation generation. In this case, the fluctuation of the stationary wave is not shown as the fluctuation of the electric voltage. As explained hereinafter, the sudden fluctuation of the stationary wave is not absorbed to tentatively fluctuate (i.e., decline) the electric voltage.

The variable amplifier 28 is constructed as a non-inverting amplifier as a whole. The variable amplifier 28 includes an operation amplifier 31, a resistor (resistance) R11 and a resistor (resistance) R12 which are connected in series to each other for serving as a feedback resistance connected to the inversion input terminal of the operational amplifier 31, and a resistor (resistance) R13 and a resistor (resistance) R15 connected in parallel with each other, and a resistor (resistance) R14 connected in series to a transistor J1 and connected in parallel with the resistor (resistance) R13. The resistors (resistances) R13, R14, R15 serve as the input resistance. The low-pass filter 27 is connected to a gate of the transistor J1 for inputting the output signal to the transistor J1.

The resistance of the transistor J1 is automatically fluctuated in accordance with the output signal level from the low-pass filter 27 (i.e., the signal strength from the receiver 12). That is, when the output signal level from the low-pass filter 27 is high, the resistance of the transistor J1 becomes large to increase the input resistance. When the output signal level from the low-pass filter 27 is low, the resistance of the transistor J1 becomes small for decreasing the input resistance. As is widely known, the larger the input resistance, the smaller the amplitude ratio (i.e. gain) of the non-inverting amplifier determined by the feedback resistance and the input resistance. Accordingly, the amplitude ratio (i.e., gain) of the non-inverting amplifier is automatically controlled to be small when the output signal level from the low-pass filter is high and to be large when the output signal level from the low-pass filter 27 is low.

An output terminal of the inverting amplifier 14 is connected to a non-inversion input terminal of the operational amplifier 31. The transmitter 11 is connected to an output terminal of the operational amplifier 31. Accordingly, the variable amplifier 28 variably amplifies the signal from the inverting amplifier 14 in the foregoing manner for re-transmitting the amplified signal from the transmitter 11.

By automatically changing the gain so that the signal strength transmitted from the transmitter 11 in accordance with the signal strength from the receiver 12 becomes approximately constant, the generated stationary wave (i.e., amplitude value or the effective value) is stabilized.

As explained above, the signal received by the receiver 12 is performed with the electric voltage conversion in the electric current-voltage conversion portion 13, the converted signal is amplified by the inverting amplifier 14, and the gain of the signal is automatically changed so that the signal strength transmitted from the transmitter 11 becomes approximately constant at the automatic gain control portion 15, and the signal is re-transmitted from the transmitter 11. As mentioned above, the phase of the signal from the receiver 12 is shifted by approximately 360 degrees via the electric current-voltage conversion portion 13, the inverting amplifier 14 and the automatic gain control portion 15. According to this disclosed and illustrated embodiment, the entire amplitude ratio from the transmitter 11 to the receiver 12 including the closed space S is predetermined to be greater than one (1) under the static state. Accordingly, by repeating the cycle for re-transmitting the amplified signal from the transmitter 11 after shifting the phase and amplifying the signal from the receiver 12 in the foregoing manner, the stable stationary wave is generated in the closed space S.

An absolute value circuit portion 16 is connected to an output terminal of the inverting amplifier 14. The absolute circuit portion 16 outputs the signal from the inverting amplifier 14 as the electric voltage value after commutating. As described above, because the gain is automatically changed so that the signal strength transmitted from the transmitter 11 becomes approximately constant in accordance with the signal strength from the receiver 12 at the automatic gain control portion 15 to stabilize the stationary wave, the output signal from the absolute value circuit portion 16 corresponds to the direct current signal (i.e., electric voltage) having a predetermined and approximately constant level in accordance with the amplitude value or the effective value of the stationary wave.

The comparison portion 17 connected to the absolute value circuit 16 includes a comparator 32, a reference electric voltage generation circuit 33, and a solenoid 34. The absolute value circuit portion 16 is connected to an inversion input terminal of the comparator 32 to be inputted with the direct current signal (i.e., electric voltage) of the level in accordance with the signal strength from the receiver 12. On the other hand, the reference electric voltage generation circuit 33 is connected to a non-inversion input terminal of the comparator 32. The reference electric voltage generation circuit 33 includes two resistors (resistances) R, R which are connected in series with each other and to a power source V+, with a connecting portion of the resistors (resistances) R, R being connected to the non-inversion input terminal of the comparator 32. The non-inversion input terminal of the comparator 32 is inputted with a divided voltage (i.e., V+/2) of the power source V+ by the resistors (resistances) R, R as a reference electric voltage Vr serving as an alarm determination electric voltage. The comparator 32 compares the direct current signal (i.e., electric voltage) from the absolute value circuit portion 16 and the reference electric voltage Vr. When the direct current signal (i.e., electric voltage) from the absolute value circuit portion 16 is greater than the reference electric voltage Vr (i.e., when the stationary wave is stable), the comparator 32 outputs a HIGH level signal from the output terminal of the comparator 32. When the level of the direct current signal from the absolute value circuit portion 16 is less than the reference electric voltage Vr (i.e., when a sudden fluctuation is generated in the stationary wave), the comparator 32 outputs a LOW level signal from the output terminal of the comparator 32.

The solenoid 34 includes a resistor (resistance) R10 connected in series with the power source V+ and a transistor T1. A base of the transistor T1 is connected to the output terminal of the comparator 32. Thus, when the HIGH level signal is inputted from the output terminal of the comparator 32, the transistor T1 becomes ON for energizing the solenoid. On the other hand, when the LOW level signal is inputted from the output terminal of the transmitter 32, the transistor T1 becomes the OFF condition. In this case, a potential is generated between the collector and the emitter of the transistor T1.

The buzzer 18 is connected between the collector emitters of the transistor T1 to be positioned in parallel with the transistor T1. The buzzer 18 generates a noise for providing an alarm by applying the difference in potential when the difference in potential is generated between the collector emitters when the transistor T1 becomes OFF.

In the embodiment described above, a stationary wave is generated in the closed space S by the compression wave of the gas such as the sonic wave and the ultrasonic wave. Thus, by monitoring the fluctuation of the stationary wave, for example, the value change of the closed space S and the change of the air flow can be detected. Thus, an intruder in the closed space S and a change or shift from the closed space to the open space (i.e., the opening of the doors and/or windows) can be detected.

According to this described and illustrated closed space monitor system, the stationary wave is generated in the closed space by constructing the self-excited oscillator with the entire portion from the transmitter 11 to the receiver 12 including the closed space S (i.e., the features 11–15 including the closed space S). With this construction, compared to the case in which the gain and the phase are controlled by monitoring the condition of the stationary wave, the system structure can be simplified.

Also, by stabilizing the stationary wave (i.e., the amplitudes value or the effective value) by the automatic gain control portion 15, the fluctuation of the stationary wave can be monitored more accurately. In addition, the intrusion detection can preferably be judged based on the fluctuation of the output signal (i.e., the electric voltage) from the absolute value circuit portion 16 corresponding to the strength (i.e., the amplitude value or the effective value) of the stationary wave.

As described above, the compression wave from the transmitter 11 is spread spherically by diffraction. Thus, the signal (i.e. compression wave) can be propagated to the entire closed space, irrespective of the presence of obstacles, for generating the stationary wave.

Figure 4A:
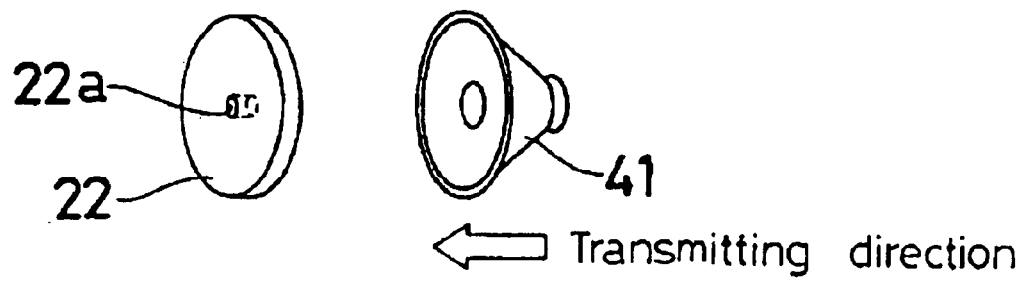
FIG. 4(a) is a perspective view of the components forming another embodiment of the transmitter used in the closed space monitor system.
Figure 4B:
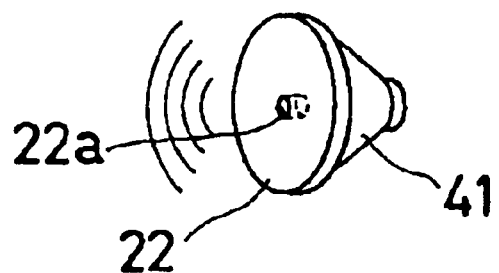
FIG. 4(b) is a perspective view of the transmitter illustrating the components shown in FIG. 4(a) in an assembled condition.

It is to be understood that the closed space monitor system is not limited to the details associated with the embodiment described above as variations can be employed. For example, as described above, the transmitter 11 includes the condenser speaker 21 having the directivity and the lid body 22 formed with the pinhole 22a in the central portion. As shown in FIGS. 4(*a*) and 4(*b*), in place of the condenser speaker 21, a magnet speaker 41 having directivity may be adopted. A lid body 22 having a pinhole 22a is once again assembled to the magnet speaker 41. The compression wave from the transmitter, transmitted in a transmitting direction indicated by the arrow in FIG. 4(*a*), is spread spherically by diffraction. In place of the condenser speaker 21, a piezoelectric speaker having the directivity may also be adopted.

Figure 5:
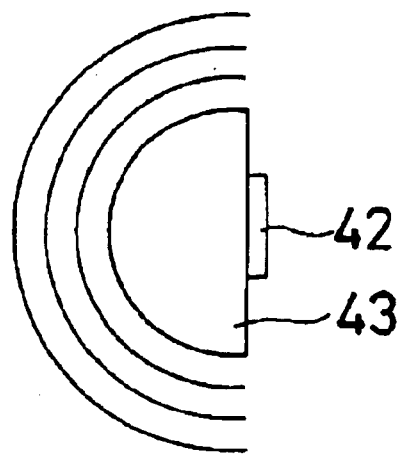
FIG. 5 is a perspective view showing still another embodiment of the transmitter.

As shown in FIG. 5, a piezoelectric oscillator 42 connected with an oscillation body 43, which corresponds to a hemispherically machined elastic body such as metal, may be adopted to serve as the transmitter. The compression wave from the transmitter is once again spread spherically.

Thus, the stationary wave is generated by propagating the signal (i.e., the compression wave) in the entire closed space, irrespective of the presence of obstacles. Also, the oscillation body 43 may be spherical or polyhedral.

Although the condenser speaker having the directivity is adopted for serving as the transmitter 11 as described above, other speakers having directivity and ultrasonic wave oscillators may be adopted as the transmitter. Also, while the condenser microphone having directivity is adopted as the receiver 12 as described above, other microphones having directivity may also be employed as the receiver.

In the embodiment described above, the reference electric voltage Vr generated in the reference electric voltage generation circuit 33 is predetermined as a threshold value (i.e., alarm determination electric voltage) in connection with generating the alarm. Instead, the stable amplitude value or the effective value from the receiver 12 after a predetermined elapse of time may be memorized for serving as the alarm determination electric voltage.

As described above, the intruder detection is judged based on the fluctuation of the output signal (electric voltage) from the absolute value circuit portion 16 corresponding to the strength (i.e., the amplitude value or the effective value) of the stationary wave. As an alternative to this construction, the intrusion detection may be judged by digitalizing the signal from the receiver 12 (i.e., absolute value circuit portion 16) and comparing the digitalized signal and the signal showing the characteristics upon intrusion with a digitalized evaluation map. In addition, the intrusion detection may be judged by memorizing the signal wave from the receiver 12 (i.e., the absolute value circuit portion 16) and comparing the signal wave with a signal wave showing the characteristics at intrusion.

Although the stationary wave (i.e., the amplitude value or the effective value) is stabilized by the automatic gain control portion 15 as described above, the gain may be controlled so that the signal strength transmitted from the transmitter 11 becomes approximately constant by performing the electric voltage control in accordance with the monitored condition of the stationary wave.

Although the stationary wave is generated in the closed space S by constructing the self-excited oscillator of the entire portion from the transmitter 11 to the receiver 12 including the closed space S, the stationary wave may be generated in the closed space by controlling the gain and the phase by monitoring the condition of the stationary wave as long as the entire amplitude ratio from the transmitter 11 to the receiver 12 including the closed space S is greater than one and the signal from the receiver 12 is transmitted from the transmitter 11 after being shifted by 360 degrees. In addition, a phase shift circuit may be applied for phase adjustment.

The stationary wave may be activated by providing a trigger circuit for inducing the stationary wave. With respect to a system for forming the closed space by closing the door, the pressure change generated in the closed space when closing the door may serve as the trigger for activating the closed space monitor system.

Also, a monitor operation may be shifted by being synchronized with the lock signal of a key less entry. The release of the monitor operation may be performed in synchronization to an unlock signal of the key less entry. Other circuit constructions may also be applied in connection with the embodiment described above and illustrated in the drawing figures.

As described above, the closed space can be preferably and advantageously monitored by detecting the volume change of the closed space and the change of the air flow. Also, the system construction can be simplified as compared to a system for controlling the gain and the phase by monitoring the condition of the stationary wave.

According to the embodiment described above, the intrusion detection can be judged based on the fluctuation of one of the amplitude value or the effective value of the stationary wave. Also, the signal (i.e., compression wave) can be propagated into the entire space for generating the stationary wave, irrespective of the presence of obstacles.

The stationary wave is generated in the closed space by the compression wave of gas such as the sonic wave and the ultrasonic wave. Thus, by monitoring the fluctuation of the stationary wave, the volume change of the closed space and the change of the air flow are detected, and so intruders and the transition from a closed space to an open space (e.g., due to the opening of a door and/or a window) are detected. In addition, the stationary wave is generated in the closed space by constructing the self-excited oscillator. Thus, the system construction is relatively simplified compared to a system which controls the gain and the phase by observing the condition of the stationary wave without the self-excited oscillator.

According to the closed space monitor system described above, one of the stationary wave, the amplitude value of the stationary wave, and the effective value of the stationary wave is stabilized. Thus, the fluctuation of the stationary wave is further accurately monitored. In addition, the intrusion detection can be preferably judged based on the fluctuation of one of the amplitude value of the stationary wave and the effective value of the stationary wave.

According to the closed space monitor system of the present invention, the compression wave transmitted from the transmitter is spread spherically by being diffracted. Thus, the signal (i.e., the compression wave) can be propagated to the entire closed space, irrespective of the existence of obstacles, to thus generate the stationary wave. Also, because the compression wave transmitted from the transmitter is spherically spread, the stationary wave can be generated by propagating the signal (i.e., the compression wave) to the entire space, irrespective of the existence of obstacles.

The principles, preferred embodiments and modes of the present invention have been described in the foregoing specification. however, the invention which is intended to be protected is not to be construed as limited to the particular embodiments disclosed. Further, the embodiments described herein are to be regarded as illustrative rather than restrictive. Variations and changes may be made by others, and equivalents employed, without departing form the spirit of the present invention. Accordingly, it is expressly intended that all such variations, changes, and equivalents which fall within the spirit and scope of the present invention as defined in the claims be embraced thereby.

What is claimed is:

1. A closed space monitor system comprising:
    a transmitter for generating and transmitting a compression wave of gas;
    a receiver for receiving the compression wave of gas and transmitting a signal;
    an amplifier portion which amplifies the signal transmitted from the receiver; and
    the amplified signal from the receiver being transmitted from the transmitter for generating a stationary wave in a closed space.

2. The closed space monitor system according to claim 1, further comprising a self-excited oscillator for generating the stationary wave in the closed space.

3. The closed space monitor system according to claim 2, further comprising:
an automatic gain control portion which automatically changes a gain so that a signal strength transmitted from the transmitter becomes approximately constant in accordance with the signal strength from the receiver;
the automatic gain control portion stabilizing one of the stationary wave, an amplitude value of the stationary value, and an effective value of the stationary wave.

4. The closed space monitor system according to claim 3, further comprising:
judging means for judging an occurrence of an intrusion into the closed space based on fluctuation of one of the amplitude value of the stationary wave and the effective value of the stationary wave.

5. The closed space monitor system according to claim 4, wherein the judging means compares an electric voltage value from the receiver in accordance with the signal strength and a predetermined alarm determination electric voltage, and judges the occurrence of the intrusion when the electric voltage value is less. than the alarm determination electric voltage.

6. The closed space monitor system according to claim 5, wherein the judging means includes a speaker having directivity with a pinhole provided on an output portion of the speaker.

7. The closed space monitor system according to claim 5, wherein the judging means includes a ultrasonic oscillator having a pinhole on an output portion of the ultrasonic oscillator.

8. The closed space monitor system according to claim 5, wherein the transmitter includes a piezoelectric oscillator connected to an elastic body having either a spherical shape or a polyhedral shape.

9. The closed space monitor system according to claim 2, wherein a fluctuation sensitivity of the stationary wave is determined by a volume of a condenser.

10. The closed space monitor system according to claim 1, further comprising:
an automatic gain control portion which automatically changes a gain so that a signal strength transmitted from the transmitter becomes approximately constant in accordance with the signal strength from the receiver;
the automatic gain control portion stabilizing one of the stationary wave, an amplitude value of the stationary value, and an effective value of the stationary wave.

11. The closed space monitor system according to claim 10, further comprising:
judging means for judging an occurrence of an intrusion into the closed space based on fluctuation of one of the amplitude value of the stationary wave and the effective value of the stationary wave.

12. The closed space monitor system according to claim 11 wherein the judging means compares an electric voltage value from the receiver in accordance with the signal strength and a predetermined alarm determination electric voltage, and judges the occurrence of the intrusion when the electric voltage value is less. than the alarm determination electric voltage.

13. The closed space monitor system according to claim 12, wherein the transmitter includes a speaker having directivity with a pinhole provided on an output portion of the speaker.

14. The closed space monitor system according to claim 12, wherein the transmitter includes an ultrasonic oscillator having a pinhole on an output portion of the ultrasonic oscillator.

15. The closed space monitor system according to claim 12, wherein the transmitter includes a piezoelectric oscillator connected to an elastic body having either a spherical shape or a polyhedral shape.

16. A closed space monitor system in a vehicle for detecting an occurrence of an intrusion into a closed space in the vehicle comprising:
a transmitter for generating and transmitting a compression wave of gas;
a receiver for receiving the compression wave and transmitting a signal;
an amplifier which amplifies the signal transmitted from the receiver;
the amplified signal from the receiver being transmitted from the transmitter for generating a stationary wave in the closed space of the vehicle, the stationary wave having an amplitude value and an effective value; and
means for judging an occurrence of an intrusion into the closed space of the vehicle based on a fluctuation of the amplitude value of the stationary wave or the effective value of the stationary wave.

17. The closed space monitor system according to claim 16, further comprising:
an automatic gain control portion which automatically changes a gain so that a signal strength transmitted from the transmitter becomes approximately constant in accordance with the signal strength from the receiver;
the automatic gain control portion stabilizing one of the stationary wave, the amplitude value of the stationary value, and the effective value of the stationary wave.

18. The closed space monitor system according to claim 16 wherein the judging means compares an electric voltage value from the receiver in accordance with the signal strength and a predetermined alarm determination electric voltage, and judges the occurrence of the intrusion when the electric voltage value is less. than the alarm determination electric voltage.

19. The closed space monitor system according to claim 16, wherein the transmitter is one of a speaker having a pinhole on an output portion of the speaker, an ultrasonic oscillator having a pinhole on an output portion of the ultrasonic oscillator, and a piezoelectric oscillator connected to an elastic body.

* * * * *